(12) United States Patent
Wang et al.

(10) Patent No.: US 12,561,383 B1
(45) Date of Patent: Feb. 24, 2026

(54) SYSTEMS FOR RECOMMENDING SEARCH QUERIES BASED ON DETERMINED USER INTENT

(71) Applicant: A9.COM, INC., Palo Alto, CA (US)

(72) Inventors: Yu Wang, Chicago, IL (US);
Zhengyang Wang, Sammamish, WA
(US); Qingyu Yin, Mountain View, CA
(US); Xianfeng Tang, San Jose, CA
(US); Xiao Cheng, Palo Alto, CA (US);
Bing Yin, Palo Alto, CA (US)

(73) Assignee: AMAZON TECHNOLOGIES, INC.,
Seattle, WA (US)

( * ) Notice: Subject to any disclaimer, the term of this
patent is extended or adjusted under 35
U.S.C. 154(b) by 369 days.

(21) Appl. No.: 18/192,958

(22) Filed: Mar. 30, 2023

(51) Int. Cl.
G06F 16/9532 (2019.01)
G06F 40/30 (2020.01)

(52) U.S. Cl.
CPC .......... G06F 16/9532 (2019.01); G06F 40/30
(2020.01)

(58) Field of Classification Search
CPC .............................. G06F 16/9532; G06F 40/30
See application file for complete search history.

(56) References Cited

U.S. PATENT DOCUMENTS

| | | | | | |
|---|---|---|---|---|---|
| 10,146,815 | B2 * | 12/2018 | Yi | ..................... | G06F 16/90324 |
| 10,290,125 | B2 * | 5/2019 | Awadallah | .......... | G06F 16/3322 |
| 11,477,142 | B1 * | 10/2022 | Lewis | ..................... | G06F 40/30 |
| 2007/0266002 | A1 * | 11/2007 | Chowdhury | ........ | G06F 16/3326 |

| | | | | | |
|---|---|---|---|---|---|
| 2009/0157599 | A1 * | 6/2009 | Klinkner | ................ | G06Q 30/02 |
| | | | | | 707/E17.135 |
| 2011/0208730 | A1 * | 8/2011 | Jiang | ................... | G06F 16/9532 |
| | | | | | 707/738 |
| 2011/0289063 | A1 * | 11/2011 | Radlinski | ............... | G06Q 30/00 |
| | | | | | 707/706 |
| 2012/0036123 | A1 * | 2/2012 | Hasan | ..................... | G06F 16/95 |
| | | | | | 707/E17.084 |
| 2012/0233140 | A1 * | 9/2012 | Collins-Thompson | ...................... |
| | | | | | G06F 16/3338 |
| | | | | | 707/706 |

(Continued)

OTHER PUBLICATIONS

Boldi, Paolo, et al. "Query reformulation mining: models, patterns,
and applications." Information retrieval 14 (2011): 257-289. (Year:
2011).*

(Continued)

*Primary Examiner* — Brian L Albertalli
(74) *Attorney, Agent, or Firm* — Lindauer Law, PLLC

(57) ABSTRACT

A sequence of search queries received from a user and the
manner in which each successive query is changed is used
to determine the intent associated with each query. The
resulting sequence of intents is used to predict the next intent
of the user, in combination with user interactions with search
results and the number of queries of different intents that
have occurred in the sequence. The predicted next intent is
then used in combination with the sequence of queries to
predict and recommend one or more subsequent search
queries that correspond with the predicted intent of the user.
Recommended queries that correspond to a changed intent
of the user avoid presentation of irrelevant information,
facilitate performance of searches by the user with less
manual input, and in some cases may enable precomputation
of search results for recommended queries to enable results
to be presented more efficiently.

20 Claims, 4 Drawing Sheets

(56) References Cited

U.S. PATENT DOCUMENTS

| | | | | |
|---|---|---|---|---|
| 2014/0172899 | A1* | 6/2014 | Hakkani-Tur | .... G06F 16/24534 707/759 |
| 2015/0379074 | A1* | 12/2015 | Marschner | ............ G06F 16/353 707/706 |
| 2018/0349472 | A1* | 12/2018 | Kohlschuetter | ..... G06F 16/3322 |
| 2019/0197165 | A1* | 6/2019 | Lyubimov | ......... G06F 16/24575 |
| 2021/0256966 | A1* | 8/2021 | Chatterjee | ................ G06N 3/04 |
| 2021/0326742 | A1* | 10/2021 | Rosset | ................... G06N 20/00 |
| 2021/0374577 | A1* | 12/2021 | Lin | ........................ G06N 5/046 |
| 2022/0172040 | A1* | 6/2022 | Kazi | ........................ G06N 3/08 |

OTHER PUBLICATIONS

Boldi, Paolo, et al. "From"dango" to"japanese cakes": Query reformulation models and patterns." 2009 IEEE/WIC/ACM International Joint Conference on Web Intelligence and Intelligent Agent Technology. vol. 1. IEEE, 2009. (Year: 2009).*

Rieh, Soo Young. "Analysis of multiple query reformulations on the web: The interactive information retrieval context." Information Processing & Management 42.3 (2006): 751-768. (Year: 2006).*

Boldi, Paolo, et al. "Query suggestions using query-flow graphs." Proceedings of the 2009 workshop on Web Search Click Data. 2009. (Year: 2009).*

Cao, Kaibo, et al. "Automated query reformulation for efficient search based on query logs from stack overflow." 2021 IEEE/ACM 43rd International Conference on Software Engineering (ICSE). IEEE, 2021. (Year: 2021).*

Ahmad, Wasi, et al., "Context Attentive Document Ranking and Query Suggestion", In Proceedings of the 42nd International ACM SIGIR Conference on Research and Development in InformationRetrieval, SIGIR 2019, Paris, France, Jul. 21-25, 2019.

Ahmad, Wasi, et al., "Multi-Task Learning for Document Ranking and Query Suggestion", In 6th International Conference on Learning Representations, ICLR 2018, Vancouver, BC, Canada, Apr. 30-May 3, 2018, Conference Track Proceedings.

Boldi, Paolo, et al. ," Query suggestions using query-flow graphs" In Proceedings of the 2009 workshop on Web Search Click Data. pp. 56-63.

Chen, Jia, et al., "Towards a Better Understanding of Query Reformulation Behavior in Web Search" In Proceedings of the Web Conference, 2021, pp. 743-755.

Chen, Jia, et al.,"Hybrid Framework for Session Context Modeling", ACM Transactions on Information Systems (TOIS) 39, 3 (2021), 1-35.

Clark, Kevin, et al., "Electra: Pre-training text encoders as discriminators rather than generators", 2020.

Dehghani, Mostafa, et al., "Learning to Attend, Copy, and Generate for Session-Based Query Suggestion" , In Proceedings of the 2017 ACM on Conference on Information and KnowledgeManagement, CIKM 2017, Singapore, Nov. 6-10, 2017.

Devlin, Jacob, et al., "Bert: Pre-training of deep bidirectional transformers for language understanding" arXiv preprint arXiv:1810. 04805 (2018).

Sun, Fei, et al., "BERT4Rec: Sequential Recommendation with Bidirectional Encoder Representations from Transformer", In Proceedings of the 28th ACM International Conference on Information and Knowledge Management, CIKM 2019, Beijing, China, Nov. 3-7, 2019. pp. 1441-1450.

Gao, Tianyu, et al., "SimCSE: Simple Contrastive Learning of Sentence Embeddings", In Proceedings of the 2021 Conference on Empirical Methods in Natural Language Processing, EMNLP 2021, Virtual Event /Punta Cana, Dominican Republic, Nov. 7-11, 2021. pp. 6894-6910.

He, Qi, et al., "Web query recommendation via sequential query prediction", In 2009 IEEE 25th international conference on data engineering. IEEE, pp. 1443-1454.

Kang, Wang-Cheng, et al., "Self-Attentive Sequential Recommendation", In IEEE International Conference on Data Mining, ICDM 2018, Singapore, Nov. 17-20, 2018. Pages 197-206.

Kingma, Diederik, et al., "Adam: A Method for Stochastic Optimization", In 3rd International Conference on Learning Representations, ICLR 2015, San Diego, Ca, USA, May 7-9, 2015, Conference Track Proceedings.

Li, Bohan, et al., "On the sentence embeddings from pre-trained language models" 2020.

Li, Jiacheng, et al., "Time Interval Aware Self-Attention for Sequential Recommendation", In WSDM '20: The Thirteenth ACM International Conference on Web Search and Data Mining, Houston, TX, USA, Feb. 3-7, 2020. Pages 322-330.

Li, Yang, et al., "Lightweight Self-Attentive Sequential Recommendation", In CIKM '21: The 30th ACM InternationalConference on Information and Knowledge Management, Virtual Event, Queensland, Australia, Nov. 1-5, 2021. pp. 967-977.

Liang, Dawen, et al., "Variational autoencoders for collaborative filtering", In Proceedings of the 2018 world wide web conference. pp. 689-698.

Mustar, Agnes, et al., "On the study of transformers for query suggestion", ACM Transactions on Information Systems (TOIS) 40, 1 (2021), pp. 1-27.

Sanh, Victor, et al., "DistilBERT, a distilled version of BERT: smaller, faster, cheaper and lighter", arXivpreprint arXiv: 1910. 01108 (2019).

Wang, Tongzhou, et al., "Understanding Contrastive Representation Learning through Alignment and Uniformity on the Hypersphere", In Proceedings of the 37th International Conference on Machine Learning, ICML 2020, Jul. 13-18, 2020, Virtual Event (Proceedings of Machine Learning Research, vol. 119). pp. 9929-9939.

Wu, Qitian, et al., "Seq2Bubbles: Region-Based Embedding Learning for User Behaviors in Sequential Recommenders", In CIKM '21: The 30th ACM International Conference on Information and Knowledge Management, Virtual Event, Queensland, Australia, Nov. 1-5, 2021. pp. 2160-2169.

Zhang, Tingting, et al., Feature-level Deeper Self-Attention Network for Sequential Recommendation. In Proceedings of the Twenty-Eighth International Joint Conference on Artificial Intelligence, IJCAI 2019, Macao, China, Aug. 10-16, 2019. pp. 4320-4326.

Brown, et al., "Language Models are Few-Shot Learners", Johns Hopkins University, Jul. 22, 2020, 75 pgs. Retrieved from the Internet: URL: https://arxiv.org/pdf/2005.14165.

Chu, et al., "H-Ernie: A Multi-Granularity Pre-Trained Language Model for Web Search", In Proceedings of the 45th International ACM SIGIR conference, Jul. 11-15, 2022, 12 Pgs.

Feng, et al., "CERES: Pretraining of Graph-Conditioned Transformer for Semi-Structured Session Data", Georgia Institute of Technology, Amazon Inc., Apr. 8, 2022, 12 pgs. Retrieved from the Internet: URL: https://arxiv.org/pdf/2204.04303.

Guo, et al., "Intent-Aware Query Similarity", CIKM'11, Oct. 24-28, 2011, 10 pgs. Retrieved from the Internet: URL: https://jiafengguo. github.io/2011/2011-Intent-Aware%20Query%20Similarity.pdf.

Huang, et al., "Relevant Term Suggestion in Interactive Web Search Based on Contextual Information in Query Session Logs", Journal of the American Society for Information Science and Technology, Mar. 13, 2003, 12 pgs. Retrieved from the Internet: URL: https:// onlinelibrary.wiley.com/doi/abs/10.1002/asi. 10256.

Jiang, et al., "RIN: Reformulation Inference Network for Context-Aware Query Suggestion", CIKM'18, Oct. 22-26, 2018, 10 pgs. Retrieved from the Internet: URL: https://jyunyu.csie.org/docs/pubs/ cikm2018paper.pdf.

Kim, et al., "Self-Guided Contrastive Learning for BERT Sentence Representations", Proceedings of the 59th Annual Meeting of the Association for Computational Linguistics, Jun. 3, 2021, 13 pgs. Retrieved from the Internet: URL: https://arxiv.org/pdf/2106.07345.

Lewis, et al., "BART: Denoising Sequence-to-Sequence Pre-training for Natural Language Generation, Translation, and Comprehension", Facebook AI, Oct. 29, 2019, 10 pgs. Retrieved from the Internet: URL: https://arxiv.org/pdf/1910.13461.

Liu, et al., "Augmenting Sequential Recommendation with Pseudo-Prior Items via Reversely Pre-training Transformer", In Proceedings of the 44th international ACM SIGIR, May 2, 2021, 5 pgs. Retrieved from the Internet: URL: https://arxiv.org/pdf/2105.00522.

Liu, et al., "Pre-trained Language Model for Web-scale Retrieval in Baidu Search", In Proceedings of the 27th ACM SIGKDD Confer-

(56) References Cited

OTHER PUBLICATIONS ence on Knowledge Discovery & Data Mining, Oct. 16, 2021, 11 Pgs. Retrieved from the Internet: URL: shttps://arxiv.org/pdf/2106. 03373.

Liu, et al., "RoBERTa: A Robustly Optimized BERT Pretraining Approach", Computer Science & Engineering, University of Washington, Facebook AI, Jul. 26, 2019, 13 pgs. Retrieved from the Internet: URL: https://arxiv.org/ pdf/1907.11692.

Mei, et al., "Query Suggestion Using Hitting Time", In Proceedings of the 17th ACM Conference on Information and Knowledge Management, Oct. 26, 2008, 9 pgs. Retrieved from the Internet: URL: https://dennyzhou.github.io/papers/sugg.pdf.

Mitra, Bhaskar, "Exploring Session Context using Distributed Representations of Queries and Reformulations", In Proceedings of the 38th international ACM SIGIR Conference on Research and Development in Information Retrieval, Aug. 9-13, 2015, 10 pgs. Retrieved from the Internet: URL: https://www.microsoft.com/en-us/research/wp-content/uploads/2015/08/sigirfp093-mitra.pdf.

Sengstock, et al., "Conquer: A system for efficient context-aware query suggestions", In Proceedings of the 20th International World Wide Web Conference Committee (IW3C2), Mar. 28-Apr. 1, 2011, 5 pgs.

Song, et al., "Query Suggestion by Constructing Term-Transition Graphs", In Proceedings of the fifth ACM international conference on Web search and Data Mining, Feb. 8-12, 2012, 10 pgs. Retrieved from the Internet: URL: http://sonyis.me/paperpdf/wsdm111-song. pdf.

Sordoni, et al., "A Hierarchical Recurrent Encoder-Decoder for Generative Context-Aware Query Suggestion", In proceedings of the 24th ACM international on Conference of Information Knowledge and Management (CIKM) Jul. 8, 2015. 10 pg. Retrieved from the Internet: URL: https://arxiv.org/pdf/1507.02221.

Su, et al., "Whitening Sentence Representations for Better Semantics and Faster Retrieval", Tencent Research, Mar. 29, 2021, 9 pgs. Retrieved from the Internet: URL: https://arxiv.org/pdf/2103.15316.

Yan, et al., "ConSERT: A Contrastive Framework for Self-Supervised Sentence Representation Transfer", Beijing University of Posts and Telecommunications, Meituan Inc., May 25, 2021, 11 pgs. Retrieved from the Internet: URL: https://arxiv.org/pdf/2105. 11741.

Yan, et al., "Context-Aware Query Recommendation by Learning High-Order Relation in Query Logs", In Proceedings of the 20th ACM International Conference on Information and Knowledge Management CIKM, Oct. 24-28, 2011. 4 pgs. Retrieved from the Internet: URL: https://jiafengguo.github.io/2011/2011-Context-Aware%20query%20recommendation%20by%20learning%20high-order%20relationship%20in%2.

Zou, et al. "Pre-trained Language Model based Ranking in Baidu Search", In Proceedings of the 27th ACM SIGKDD Conference on Knowledge Discovery & Data Mining, Jun. 25, 2021, 9 pgs. Retrieved from the Internet: URL: https://arxiv.org/pdf/2105.11108.

* cited by examiner

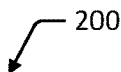

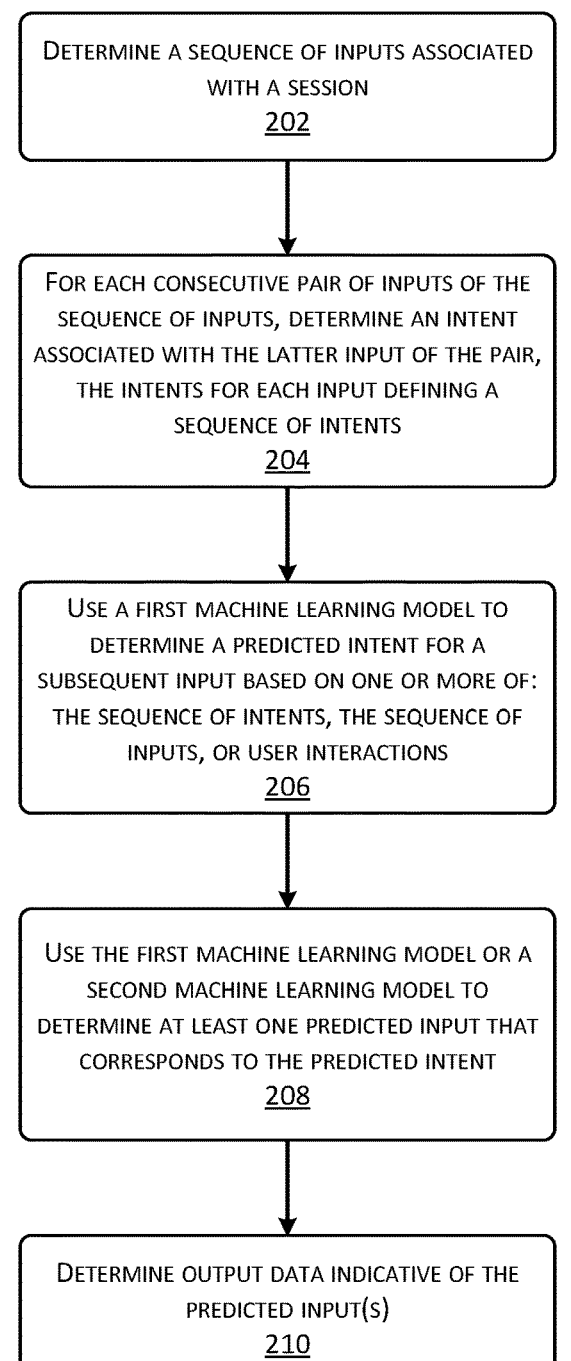

DETERMINE A SEQUENCE OF INPUTS ASSOCIATED
WITH A SESSION
202

FOR EACH CONSECUTIVE PAIR OF INPUTS OF THE
SEQUENCE OF INPUTS, DETERMINE AN INTENT
ASSOCIATED WITH THE LATTER INPUT OF THE PAIR,
THE INTENTS FOR EACH INPUT DEFINING A
SEQUENCE OF INTENTS
204

USE A FIRST MACHINE LEARNING MODEL TO
DETERMINE A PREDICTED INTENT FOR A
SUBSEQUENT INPUT BASED ON ONE OR MORE OF:
THE SEQUENCE OF INTENTS, THE SEQUENCE OF
INPUTS, OR USER INTERACTIONS
206

USE THE FIRST MACHINE LEARNING MODEL OR A
SECOND MACHINE LEARNING MODEL TO
DETERMINE AT LEAST ONE PREDICTED INPUT THAT
CORRESPONDS TO THE PREDICTED INTENT
208

DETERMINE OUTPUT DATA INDICATIVE OF THE
PREDICTED INPUT(S)
210

FIG. 2

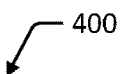

COMPUTING DEVICE(S)
402

POWER SUPPLY
404

COMMUNICATION
INTERFACE(S) 410

I/O INTERFACE(S)
412

NETWORK
INTERFACE(S) 414

I/O DEVICE(S) 416

PROCESSOR(S)
406

CLOCK(S)
408

MEMORY 418

OPERATING SYSTEM MODULE
420

COMMUNICATION MODULE
424

INTENT DETERMINATION MODULE
106

INTENT PREDICTION MODULE
110

QUERY PREDICTION MODULE
114

ENCODING MODULE
118

OUTPUT MODULE
122

OTHER MODULE(S)
426

DATA STORE 422

PREDICTED INTENT 102

QUERIES 104

QUERY INTENTS 108

USER INTERACTION DATA 112

PREDICTED QUERIES 116

FEATURE EMBEDDINGS 120

OUTPUT DATA 124

OTHER DATA 428

FIG. 4

SYSTEMS FOR RECOMMENDING SEARCH QUERIES BASED ON DETERMINED USER INTENT

BACKGROUND

A user of an online store or other entity may input search queries to locate items that are of interest to the user. Query recommendation systems may be used to output recommended queries based on previous queries that have been input. Use of recommended queries may cause the user to become aware of features that the user may not have selected for input, and may reduce the time and manual steps involved in searching for items of interest. However, the intent of a user may change throughout a series of search queries, causing recommended queries to lack relevance.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 is a flow diagram depicting an implementation of a method for predicting and recommending future inputs based on a predicted intent associated with a sequence of inputs.

FIG. 4 is a block diagram depicting an implementation of a computing device within the present disclosure.

Figure 1:
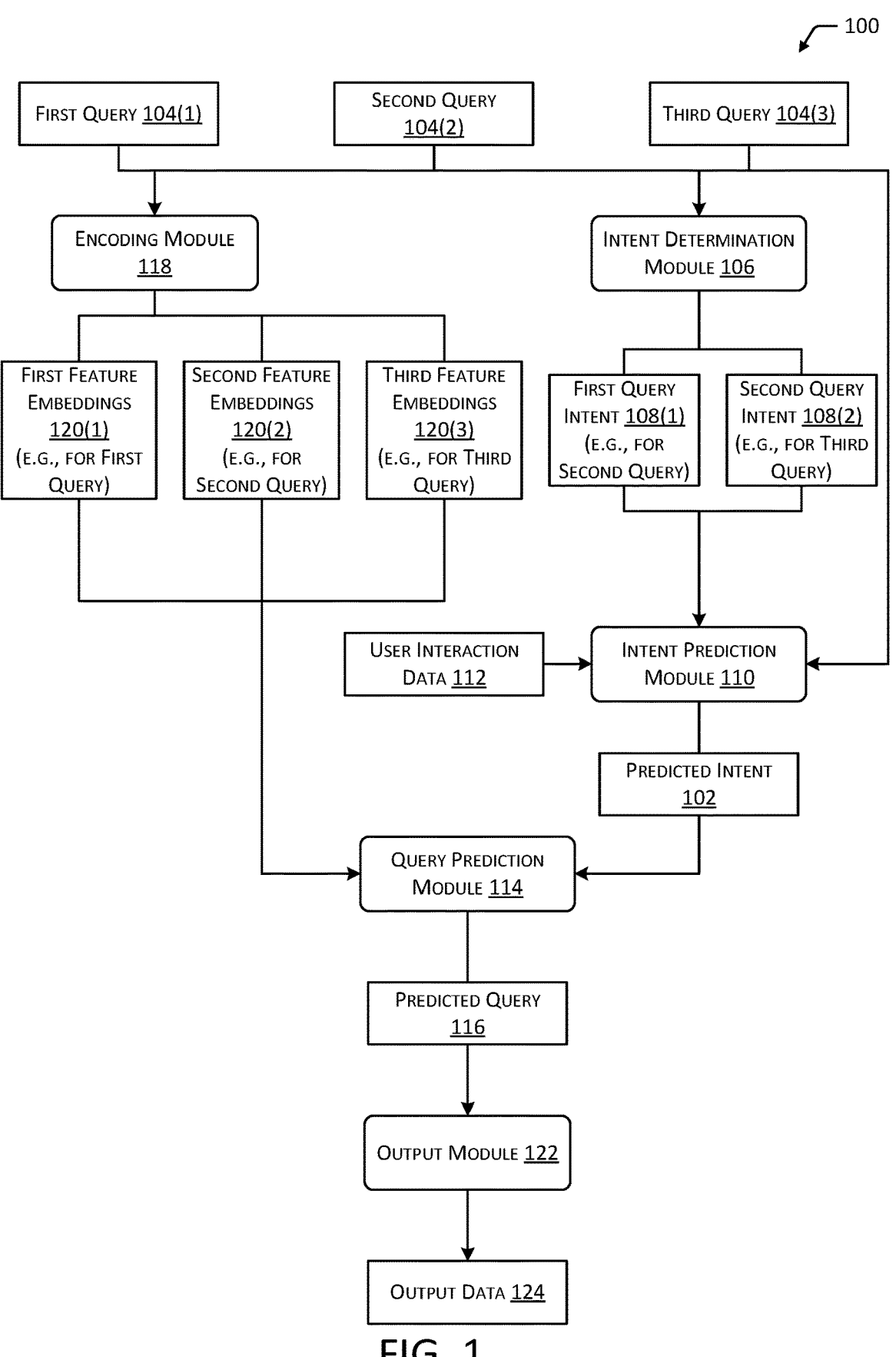
FIG. 1 is a diagram depicting an implementation of a system for predicting and recommending search queries based in part on a predicted intent associated with a user or other source of a sequence of search queries.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to coverall modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Websites, applications, and other types of user interfaces associated with online stores or other entities may be used to initiate transactions for items, such as purchases, leases, subscriptions, and so forth. User interfaces may include a search interface that may receive a search query as input. For example, a user of an online store may input a search query that includes text (e.g., keywords) that is descriptive of an item or type of item, responsive to which one or more search results that correspond to the text of the query may be presented. Some interfaces use a query recommendation system to output suggested or recommended queries based on previous queries that the user has input. For example, enabling a user to select from one or more suggested queries may reduce the manual steps involved in searching for items of interest and may cause the user to become aware of items that the user may not have discovered in the absence of a suggested query. However, query recommendation systems may frequently present inaccurate or irrelevant recommendations that do not correspond to the intent of the user. For example, a user that was initially searching for a first type of item may begin searching for items that are related to or complementary to the first type of item, and recommended queries that are specific to the first type of item may no longer be relevant. However, the intent of a user is not expressed when a search query is input, and inferring user intent from a series of query reformulations is subject to inaccuracy.

Described in this disclosure are techniques for predicting and recommending a subsequent search query to a user that accounts for the changing intent of the user during the search process. Determining recommended queries that correspond to a changed intent of the user may avoid presentation of irrelevant queries and enable a user to select a query of interest without requiring manual input of the query by the user. Presentation of relevant queries may decrease the number of interactions between a user and a system that occur, conserving computational resources associated with additional exchanges of data, generation of interfaces, and so forth. During a session, a sequence of search queries may be received. The manner in which each successive query is changed relative to the previous query may indirectly represent the intent of the user associated with the reformulation of the query. An intent of a user with regard to a query or other type of input may include an explanation or rationale associated with the input, such as a reason for providing the input. For example, the manner in which a second input has been changed relative to a first input may be indicative of the intent of the user. In some implementations, determination of an intent may be performed as a classification process. For example, query reformulation intents may be classified as: specification, generalization, equivalence, substitution, complement, and irrelevant. A first machine learning model may be trained to determine a type of intent associated with a query reformulation using a pair of queries within a sequence as inputs. Based on a sequence of queries, the first machine learning model may be used to determine an intent associated with each successive query. The intents associated with each query effectively define a sequence of intents associated with the search queries. This sequence of intents is then used with the model to predict the next intent for a subsequent query. In some implementations, in addition to the sequence of intents itself, the total number of queries that have occurred in the sequence of queries, the numbers of queries associated with particular types of intents, the numbers of queries that have occurred after a particular type of intent, normalized total counts of queries or counts of queries associated with particular types of intents, and so forth, may also be used to predict the next intent. For example, the intent of a user may be more likely to change from a first type to a second type after inputting multiple search queries of the first type. Additionally, in some implementations, user interactions may be used to predict the next intent. For example, after a user has purchased an item or added an item to an electronic shopping chart, the user may be more likely to search for items that are complementary to the purchased or added item rather than continuing to search for items that are similar to the purchased or added item. In some implementations, counts of queries may be normalized or otherwise processed prior to providing data indicative of the count(s) to a machine learning model. In other implementations, the machine learning model may be trained to use a count of queries as an input.

A second machine learning model may be trained to determine one or more predicted subsequent queries based on a predicted intent of a user and the sequence of queries associated with the user. The sequence of queries and the predicted intent may then be used as inputs to the second machine learning model to determine one or more predicted subsequent queries that correspond to the predicted intent. At least one predicted query may be presented as output, such as in conjunction with a search interface or a set of search results to a previous query. Selection of a predicted query may enable the user to search for items of interest using fewer manual steps and computational resources. Additionally, in some implementations, search results associated with one or more predicted queries may be precomputed to enable more efficient presentation of search results in response to selection of a predicted query by the user.

Implementations described herein may therefore result in improved relevance of recommended queries, that account for the changing intent of a user when searching for items of interest. For example, presentation of a recommended query that accounts for a predicted change in the intent of the user avoids presentation of irrelevant suggestions that may diminish the user experience, and enables selection of a relevant query without requiring manual input of the query. Additionally, a recommended query may include search terms of which the user was unaware and was unlikely to input manually, that are likely to yield relevant search results the user may not have encountered in the absence of the recommended query. Reducing manual input and the number of interfaces generated as data is exchanged between a system and a user may conserve computational resources. Further, as described previously, in some implementations, search results associated with one or more predicted queries may be precomputed to enable more efficient presentation of search results in response to selection of a predicted query by the user. While implementations described herein describe determining predicted search queries based on a previous sequence of search queries and a predicted intent of a user, other implementations may be used for other types of input in addition to or in place of search queries.

FIG. 1 is a diagram 100 depicting an implementation of a system for predicting and recommending search queries based in part on a predicted intent 102 associated with a user or other source of a sequence of search queries. A search query may include text, such as keywords, phrases, numerals, characters, punctuation, or other types of data that may be provided as input for performance of a search operation in which one or more search results having characteristics that correspond to the text of the search query are determined. In other implementations, a search query may include one or more other types of data such as audio data, image data, video data, and so forth. For example, a search query may be input as speech, and speech-to-text techniques may be used to determine text associated with the search query. As another example, image recognition techniques may be used to determine text based on image data or video data.

A sequence of search queries may include multiple search queries that are input at different times. For example, FIG. 1 depicts a first query 104(1) that may include first text that is input at a first time, a second query 104(2) that may include second text that differs from the first text and is input at a second time after the first time, and a third query 104(3) that may include third text that differs from the second text and is input at a third time after the second time. While FIG. 1 depicts three example queries, any number of queries may be included in a sequence.

Additionally, while FIG. 1 depicts an implementation in which search queries are used to determine a predicted intent 102 and a predicted subsequent search query for recommendation, in other implementations, other types of inputs may be received and used to determine a predicted intent 102 and a predicted subsequent input based in part on the predicted intent 102. For example, other types of input may be determined based on session data associated with a user device or user account. Continuing the example, a user may interact with one or more computing devices external to the system depicted in FIG. 1, and through an interaction with an external device, may engage a navigational link or other feature to access the system. Data associated with the navigational link, or other session data, may be useable to determine a predicted intent 102 and predicted subsequent input. For example, session data may indicate a search query provided to a different system responsive to which a navigational link to one or more interfaces associated with the system shown in FIG. 1 may be presented. As another example, other types of input may include user interactions associated with items or other interfaces, such as navigation to interfaces that present information regarding items, the addition of items to electronic shopping carts or other lists, initiation of purchase transactions or other transactions for items, and so forth. These other types of input may be used, in addition to or in place of search queries, to determine a predicted intent 102 and a predicted subsequent input.

As described previously, when a subsequent query that differs from a previous query is received, the manner in which the subsequent query has been reformulated or otherwise changed may be used to determine a possible intent associated with the subsequent query. For example, if a subsequent query includes additional keywords or more specific keywords than a previous query, this may indicate a "Specification" intent in which a user is seeking greater precision in search results, such as a more specific item having characteristics of interest. If a subsequent query includes fewer keywords or less specific keywords than a previous query, this may indicate a "Generalization" intent in which a user is seeking a larger number of less specific search results. If a subsequent query replaces keywords of a previous query with different or alternative keywords in the subsequent query, such as by substituting an alternate brand name or other characteristic for a previous characteristic, this may indicate a "Substitution" intent in which a user is seeking alternative items to those presented in response to the previous query. If a subsequent query includes keywords that are related to the keywords or search results associated with a previous query, this may indicate a "Complementary" intent in which a user is seeking items that are related to or complementary to an item associated with the previous search query. If a subsequent query includes keywords that are not similar or related to the keywords of a previous query, this may indicate an "Irrelevant" intent in which the user is no longer seeking items associated with the pervious query. If a query includes keywords that are unique or highly specific to a particular item, this may indicate an "Equivalence" intent in which the user is seeking a specific item. An intent associated with a query or other type of input may include an explanation or rationale associated with the input.

For example, determination of an intent may include use of a classification process to determine a specific type of intent from among preselected set of types, or in some cases, probability values associated with one or more types of intent that indicate a likelihood that an input is associated with particular type(s) of intent.

An intent determination module 106 associated with the system may be used to determine intents associated with the second query 104(2), third query 104(3), and any subsequent queries that are received. For example, based on the manner in which the second query 104(2) differs from the first query 104(1), a first query intent 108(1) associated with the second query 104(2) may be determined. Based on the manner in which the third query 104(3) differs from the second query 104(2), a second query intent 108(2) associated with the third query 104(3) may be determined. For example, the intent determination module 106 may include a machine learning model that is trained to estimate a query intent associated with a pair of input queries that occur consecutively in a sequence of queries. Continuing the example, based on a pair of input queries, the model may generate a vector denoting the probability that transition between the input queries is associated with a particular type of query intent, as illustrated in Equation 1.

$$i_t = \mathrm{Softmax}[LM_\phi(q_{t-1}, q_t)] \in R^{1 \times C} \qquad \text{(EQUATION 1)}$$

In Equation 1, $q_{t-1}$ represents a first query, $q_t$ represents a second query that occurs consecutively after the first query, and $i_t$ represents the determined type of intent associated with the second query. C represents the number of possible types of intents. $LM_\phi$ represents the parameters of the machine learning model associated with the intent determination module 106. The parameters may be optimized using cross-entropy loss between the types of intents predicted by the machine learning model and a set of ground-truth labels.

While FIG. 1 depicts the intent determination module 106 determining a first query intent 108(1) based on the first query 104(1) and the second query 104(2), and the second query intent 108(2) based on the second query 104(2) and the third query 104(3), any number of query intents may be determined for a sequence of queries. The consecutive query intents determined using the intent determination module 106 represent a sequence of intents associated with the sequence of queries.

An intent prediction module 110 associated with the system may determine a predicted intent 102 for a subsequent query based at least in part on the sequence of intents determined using the intent determination module 106. In some implementations, the intent prediction module 110 may include a machine learning model, or a masked self-attention layer of the machine learning model associated with the intent determination module 106, that is trained to, for a sequence of intents ([$i_1, \ldots, i_t$]), predict a subsequent intent ($i_{t+1}$), such as an autoregressive sequential model, using the features of previous intents ($i_{\leq t}$) as inputs, as illustrated in Equation 2.

$$a_t = \mathrm{Softmax}\{[(i_j W^q)(i_t W^k)^T]\}, \text{from } j=1 \text{ to } t, \in R^{1 \times t}$$

$$i'_t = MSA(i_{\leq t}) = \Sigma \alpha_{t,j} \cdot ij W^v, \text{taken from } j=1 \text{ to } t \qquad \text{(EQUATION 2)}$$

In Equation 2, $W^q$, $W^k$, and $W^v$ are linear transformation matrices in the self-attention of dimension $R^{C \times C}$, and MSA represents the masked self-attention layer of the machine learning model. Additionally, $i'_t$ represents the predicted intent 102 for $i_{t+1}$.

In some implementations, the intent prediction module 110 may use other data, in addition to the sequence of intents determined by the intent determination module 106, to determine a predicted intent 102 for a subsequent query. For example, a total count of the sequence of queries, or a count of a subset of the sequence of queries may be used to determine the predicted intent 102. Continuing the example, a temporal relationship between a subsequent query and a total count of queries in the sequence of queries may be associated with a higher probability that a user will change intent types for the subsequent query. In some cases, a count of queries associated with a particular type of intent may be associated with a probability that a user will change intent types in a subsequent query. For example, if a user has input four queries associated with the "Specification" intent type, a greater probability may exist that the subsequent query will be associated with the "Substitution" intent type. However, if a user has input a smaller number of queries, a greater probability may exist that the subsequent query will be associated with the "Specification" or "Generalization" type. In some cases, a count of queries that occur after a particular intent type may be used to determine the predicted intent 102. For example, if an "Irrelevant" intent type is determined, previous queries that occurred before this determination of the "Irrelevant" intent type may be excluded from subsequent counts of queries when determining predicted intents 102.

In other implementations, the intent prediction module 110 may access user interaction data 112, which may be used in part to determine a predicted intent 102 for a subsequent query. A user interaction may include initiation of a transaction for an item, such as a purchase, lease, or subscription, the addition of an item to an electronic shopping cart or other list, navigation to an interface that includes information regarding an item, and so forth. For example, in cases where a user initiates a purchase transaction for an item or adds an item to an electronic shopping cart, the probability that the intent of the user may change for a subsequent query may increase. Continuing the example, after a user has input a query of the "Specification" intent type, was presented with search results, and selected an item for purchase, it is unlikely that the user's intent to continue providing "Specification" queries for the same or similar items will remain. Instead, a larger probability may be determined that the user's intent may change to "Complementary", and a predicted subsequent query may include keywords relating to items that are related or complementary to the purchased item.

The predicted intent 102 determined by the intent prediction module 110 may be used as an input to a query prediction module 114 to determine a predicted query 116. In some implementations, the predicted intent 102 may include an indication of a single type of intent, such as a type of intent that is determined to be associated with a largest probability value. In other implementations, the predicted intent 102 may include indications of multiple types of intent, such as a set of weights or probability values associated with multiple intent types. The query prediction module 114 may also use the text of the sequence of queries as inputs to determine the predicted query 116.

For example, an encoding module 118 may process the text of the first query 104(1), second query 104(2), third query 104(3), and any additional queries in the sequence of queries to determine feature embeddings 120 that represent the text of the queries. Each query may include text, such as keywords, as well as semantic information, such as the arrangement of words, capitalization, punctuation, other characters, and so forth. In some cases, a query may also be associated with other data, such as an indication of a human language associated with the query, user data indicative of geographic or demographic characteristics associated with a user or user account, device data indicative of hardware or software components of a device, network identifiers indicative of a geolocation associated with a user device, and so forth. The encoding module 118 may include one or more machine learning models, such as a Bidirectional Encoder Representations from Transformers (BERT) model, or other types of language models or encoders. Use of an existing or pre-trained language model may enable meaningful query embeddings to be generated based on the text of the first query 104(1), second query 104(2), and third query 104(3). FIG. 1 depicts the encoding module 118 determining first feature embeddings 120(1) based on the first query 104(1), second feature embeddings 120(2) based on the second query 104(2), and third feature embeddings 120(3) based on the third query 104(3).

In some implementations, a multilayer perception (MLP) model may be used in conjunction with the output from a BERT or other type of pretrained language model (PLM) to map the determined query embeddings to a desired latent space, as described in Equation 3.

$$q_t = MLP_{\theta_2}(PLM(q_t)) \qquad \text{(EQUATION 3)}$$

In Equation 3, for a given query ($q_t$) processed using the multilayer perception (MLP) model and the pretrained language model (PLM), $\theta_2$ may represent the parameters of the MLP model. In some implementations, the sequence of queries and the transition patterns in the sequence may be learned using a variable autoencoder (VAE) framework that includes masked self-attention (MSA) layers. A VAE framework may determine the posterior distribution ($p_{\theta_3}(z_t|q_{\leq t})$ $\sim N(\mu_t, \Sigma_t)$) of the sequence of queries, where $z_t$ represents the hidden state of a query at time t, $q_{\leq t}$ represents queries that occur before time t, $\Sigma_t$ represents the diagonal covariance matrix: $diag(\sigma^2_t)$. The mean ($\mu_t$) and standard deviation ($\sigma_t$) may be estimated based on Equation 4.

$$\mu_t = MSA_\mu(q \leq t), \sigma_t = MSA_\sigma(q \leq t) \qquad \text{(EQUATION 4)}$$

In Equation 4, $MSA_\mu$ ($q \leq t$) and $MSA_\sigma$ ($q \leq t$) may each represent a masked self-attention layer of the encoding module 118 to estimate the corresponding mean ($\mu_t$) and covariance ($\Sigma_t$) of the hidden state $z_t$, given each of the queries that occur before time t. Based on this learned distribution, a latent vector for each state may be sampled through a reparameterization technique, as described in Equation 5.

$$z_t = \mu_t + \varepsilon \bigodot \sigma_t \qquad \text{(EQUATION 5)}$$

In Equation 5, $z_t$ is the hidden state of the query at time t and $\mu_t$ and $\sigma_t$ are the mean and standard deviation, as described above. Noise sampled from standard Normal distribution is represented by $\varepsilon$.

As described previously, the query prediction module 114 may use at least a portion of the first feature embeddings 120(1), second feature embeddings 120(2), third feature embeddings 120(3), and the predicted intent 102 as inputs to determine a predicted query 116. In some implementations, the query prediction module 114 may include a machine learning model that is trained to determine one or more predicted queries 116 based on predicted intents 102 and feature embeddings. For example, by using the predicted intent 102 as an input, a predicted query 116 that corresponds to the predicted intent 102 may have a greater probability of being determined than queries that would be predicted based on the text of previous queries in the absence of the predicted intent 102. As such, by determining a sequence of intents and using the sequence of intents to determine the predicted intent 102, times when an intent of the user is likely to change and recommendation of queries of the same type as previous queries would not be beneficial to the user may be more accurately accounted for using the query prediction module 114.

In some implementations, at least a portion of the determined feature embeddings may be used to generate a series of output vectors using a multi-head masked self-attention mechanism of the query prediction module 114, as described in Equation 6.

$$q_j^t = MSA^j(z_{\leq t}), j=1, \ldots, C \qquad \text{(EQUATION 6)}$$

As described previously, in Equation 6, C represents the number of possible types of intents that may be determined. For example, a system that is configured to determine the intent types "Specification", "generalization", "equivalence", "substitution", "complement", and "irrelevant" would assign a value of 6 to C so that each head of the query prediction module 114 may encode specific information for each type of intent. The predicted intent 102 may then be used to determine one or more predicted queries 116 based on a weighted concatenation of the multi-head outputs up to a linear transformation, as described in Equation 7.

$$q'_t = Concat\{[i'_{t,(j)}, q^j_t], \text{from } j=1 \text{ to } C\}W^0 \qquad \text{(EQUATION 7)}$$

In Equation 7, $i'_t$ represents a vector indicating the predicted intent 102 for time t. Using the output representation for the query feature embeddings associated with time t ($q'_t$), a rating score (R) for a target query (Q) may then be computed as $R = q'_t \cdot Q$.

In some implementations, the query prediction module 114 may perform one or more optimization processes to determine the predicted query 116. For example, determination of a predicted query 116 may include a loss-minimization process. The loss ($L_{rec}$) associated with prediction of a query may be represented by Equation 8.

$$L_{rec} = \Sigma(\log \sigma(r_{t,t+1}) + \log(1 - \sigma(r_{t,k})), \text{with the sum taken} \\ \text{from } t=1 \text{ to } t-1 \qquad \text{(EQUATION 8)}$$

In Equation 8, $r_{t,t+1}$ represents a rating ($q'^T_t \cdot q_{t+1}$) of a ground-truth positive example ($q_{t+1}$), while $r_{t,k}$ represents a rating ($q'^T_t \cdot q_k$) of a negative query $q_k$. Kullback-Leibler divergence ($L_{kl}$) between the estimated posterior distribution and standard Normal distribution for each time t may be minimized based on Equation 9.

$$L_{kl} = \Sigma\Sigma(\sigma^2_{t,d} + \mu^2_{t,d} - 1 - \log \sigma^2_{t,d}), \text{first sum taken from} \\ d=1 \text{ to } 2, \text{second sum taken from } t=1 \text{ to } t-1 \qquad \text{(EQUATION 9)}$$

In some implementations, a small number of dimensions of the feature embeddings for a sequence of queries may be used to encode information, which may result in a high degree of similarity between different queries when analyzed using the query prediction module 114. In such a case, adoption of a simple uniformity loss ($L_U$) as regularization may be used to distribute feature embeddings for queries isotropically in a latent space, as described in Equation 10.

$$L_U = \log \Sigma\{e - \|qi - qj\|^2_2/2\} \qquad \text{(EQUATION 10)}$$

In some implementations, the query prediction module 114 may determine a single predicted query 116, such as a predicted query 116 associated with a greatest rating or probability value. In other implementations, the query prediction module 114 may determine multiple predicted queries 116. For example, predicted queries 116 having a probability value of at least a threshold, or a selected number of predicted queries 116 having the greatest probability values may be presented in an interface for selection by a user.

An output module 122 may determine output data 124 based on the predicted query 116. Output data 124 may be provided to a computing device associated with a user to cause output indicative of one or more predicted queries 116. For example, one or more predicted queries 116 may be presented in association with a search interface, or in association with a set of search results received in response to a previous query. Manual selection of a precited query 116 may enable a user to search for items of interest using fewer manual steps, may provide the user with awareness of search terms or item characteristics that the user may not have input manually, and may conserve computational resources. In some implementations, search results associated with one or more predicted queries 116 may be precomputed to enable more efficient presentation of search results in response to selection of a predicted query by the user.

FIG. 2 is a flow diagram 200 depicting an implementation of a method for predicting and recommending future inputs based on a predicted intent 102 associated with a sequence of inputs. At 202, a sequence of inputs associated with a session may be determined. As described with regard to FIG. 1, in some implementations, one or more inputs of the sequence of inputs may include search queries, which may include text, semantic information, and so forth that may be used to determine items or other content that corresponds to the text of the queries. In other implementations, an input may include interactions with external devices or systems, such as engaging a navigational link or other feature associated with an external system to access the system shown in FIG. 1. In some implementations, input may include user interactions associated with items or other interfaces, such as navigation to interfaces that present information regarding items, the addition of items to electronic shopping carts or other lists, initiation of purchase transactions or other transactions for items, and so forth. In other implementations, combinations of types of input may be used. For example, session data may indicate use of a navigational link to access an interface associated with the system. The user may then input a search query, search results that are responsive to the search query may be presented, and the user may interact with one or more search results.

At 204, for each consecutive pair of inputs of the sequence of inputs, an intent associated with the later input of the pair may be determined. The intents for each input may define a sequence of inputs. For example, as described with regard to FIG. 1, an intent determination module 106 may be trained to determine an intent associated with an input based on a pair of inputs that occur consecutively. Continuing the example, the manner in which a second input differs from a first input may be used to determine an intent associated with the differences between the second input and the first input. This process may be performed for each pair of consecutive inputs associated with the sequence of inputs, or in some implementations, with a selected subset of the inputs. Determining the intent associated with multiple consecutive inputs may define a sequence of intents. The manner in which the intents associated with a sequence of inputs change over time may be used to determine a predicted intent 102 for a subsequent input. An intent may include an explanation or rationale associated with an input. In some implementations, determination of an intent may include use of a classification process to determine a specific type of intent or probability values associated with one or more types of intent, from among a selected set of types.

For example, at 206, a first machine learning model may be used to determine a predicted intent 102 for a subsequent input based on one or more of: the sequence of intents, the sequence of inputs, or user interactions. As described with regard to FIG. 1, an intent prediction module 110 may be trained to determine a predicted intent 102 based on a sequence of intents associated with a sequence of inputs. In some implementations, other data may be used, such as a total count of the sequence of inputs, a count of a subset of the sequence of inputs, or a normalized total count or count of a subset of inputs. For example, a subset of the sequence of inputs may include inputs that occur after a particular input associated with a particular type of intent, or a group of inputs that occur consecutively are associated with the same type of intent. In some cases, the total count or a normalized count of inputs may also affect the predicted intent 102. For example, a relationship between a count associated with a current input and the total count may be used in part to determine the predicted intent 102. In some cases, user interaction data 112, may be used in part to determine a predicted intent 102 for a subsequent input. For example, a transaction for an item, the addition of an item to an electronic list, or navigation to an interface associated with an item may affect a predicted intent 102 for a subsequent input.

At 208, the first machine learning model or a second machine learning model may be used to determine at least one predicted input based on the sequence of inputs and the predicted intent 102. The determined predicted input(s) may correspond to the predicted intent 102. As described with regard to FIG. 1, inputs, which in some implementations may include search queries, may be encoded or otherwise processed to determine feature embeddings that represent text, semantic information, or other characteristics of the inputs. The predicted intent 102 and at least a portion of the determined feature embeddings may be used by a machine learning model to determine a predicted query 116 or other type of subsequent input that corresponds to the predicted intent 102. In some implementations, multiple predicted inputs may be determined.

At 210, output data 124 of the predicted input(s) may be determined. In some implementations, one or more predicted inputs may be presented in association with an interface for receiving inputs. In other implementations, one or more predicted inputs may be presented in association with a set of results or an interface that is accessed in response to a previous input. Selection of a precited input by a user may enable a user to accomplish a task using fewer manual steps and may enable responses or interfaces associated with a predicted input to be precomputed to enable more efficient presentation of output in response to selection of a predicted query 116 by the user.

Figure 3:
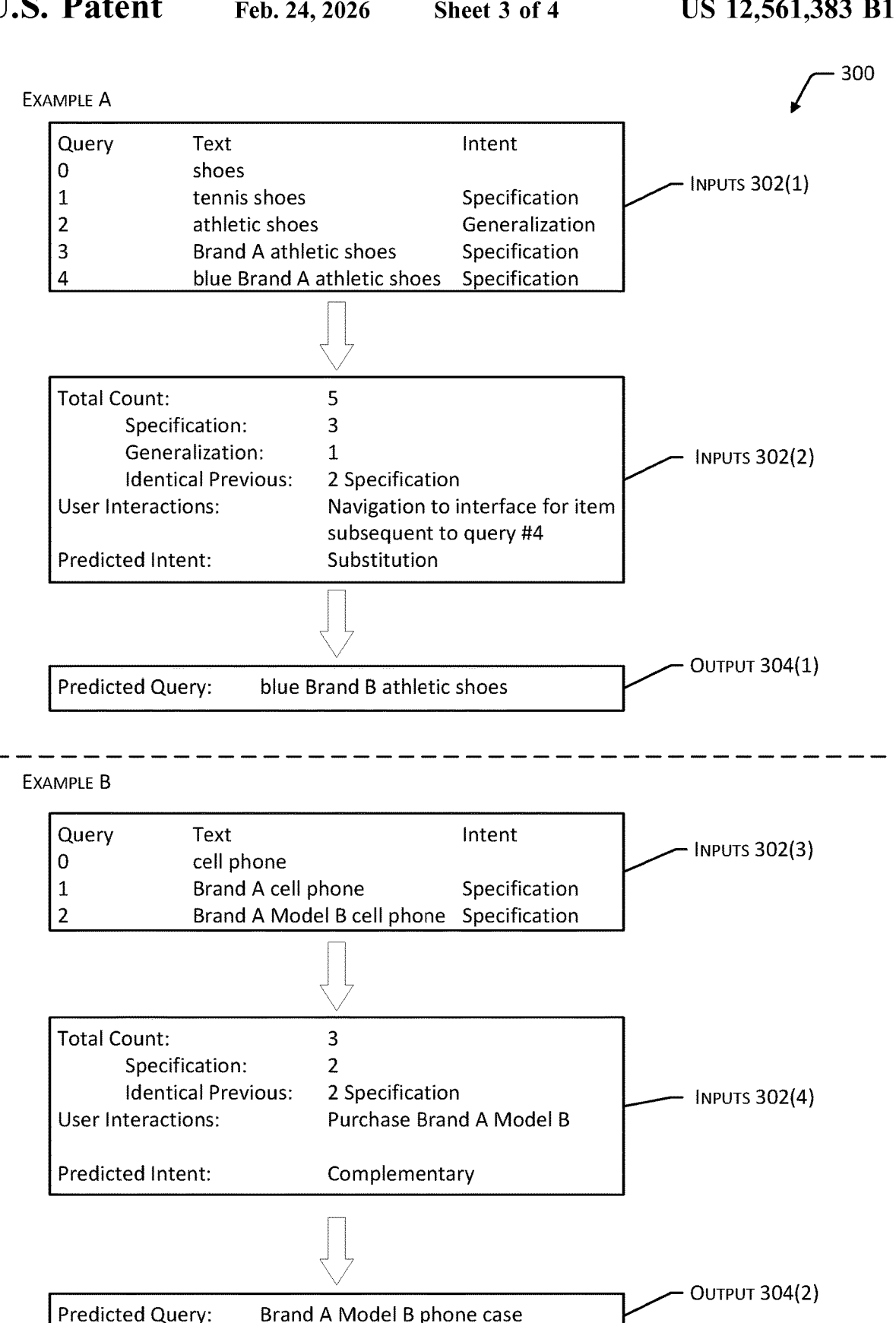
FIG. 3 is a diagram depicting example inputs and outputs associated with predicting and recommending search queries based in part on a predicted intent and a sequence of previous search queries.

FIG. 3 is a diagram 300 depicting example inputs 302 and outputs 304 associated with predicting and recommending search queries based in part on a predicted intent 102 and a sequence of previous search queries. In a first example ("Example A"), a first set of inputs 302(1) includes a sequence of search queries that includes five queries, and a sequence of intents determined for each pair of consecutive search queries that includes four intents. Specifically, a first query (Query 0) includes the text "shoes". A second query (Query 1) includes the text "tennis shoes", and the determined intent type "Specification" due to the addition of keywords to further narrow the first query and improve precision of search results. A third query (Query 2) includes the text "athletic shoes", and the determined intent type "Generalization" due to the replacement of the specific keyword "tennis" with a broader keyword "athletic" to increase the number of relevant search results. A fourth query (Query 3) includes the text "Brand A athletic shoes", and the determined intent type "Specification" due to the addition of the keyword "Brand A". A fifth query (Query 4) includes the text "blue Brand A athletic shoes", and the determined intent type "Specification" due to the addition of the keyword "blue".

A second set of inputs 302(2) may be determined based on the first set of inputs 302(1). For example, in addition to the sequence of queries and the sequence of intents represented by the first inputs 302(1), other inputs may include a total count of search queries, counts of specific types of intents associated with the search queries, a count of the most recent consecutive queries associated with the same intent type, and so forth. The second inputs 302(2) may also include one or more user interactions, such as purchases of items associated with search results or additions of items associated with search results to electronic lists. For example, FIG. 3 depicts user interactions that include navigation to an interface for an item subsequent to the final query indicated in the first inputs 302(1). Based on the sequence of intents included in the first inputs 302(1), and in some cases other inputs included in the first inputs 302(1) and second inputs 302(2), a predicted intent 102 may be determined. In the first example (Example A) shown in FIG. 3, the predicted intent includes the intent type "Substitution". For example, a high probability may exist that after inputting five search queries primarily related to specifying a search for particular athletic shoes, and navigating to an interface for an item without purchasing the item or adding the item to an electronic shopping cart, the user may choose to search for alternate or substitute items.

Based on the first inputs 302(1) and the second inputs 302(2), the first example is shown generating an output 304(1) that includes the predicted query 116 "blue Brand B athletic shoes", which corresponds to the predicted intent 102 of "Substitution" by replacing a query keyword ("Brand A") with an alternative substitute keyword ("Brand B").

In a second example ("Example B"), an initial set of inputs 302(3) is shown including a sequence of search queries and a sequence of determined intents that include a first query (Query 0) with the text "cell phone". A second query (Query 1) is shown including the text "Brand A cell phone" and the intent type "Specification" due to the addition of a first keyword to improve the precision of the search results. A third query (Query 2) is shown including the text "Brand A Model B cell phone" and the intent type "Specification" due to the addition of a second keyword to improve the precision of the search results.

A subsequent set of inputs 302(4) may be determined based on the initial inputs 302(3). For example, the subsequent inputs 302(4) indicate a total count of search queries, a count of queries having a particular intent type, and one or more user interactions associated with search results. In the subsequent inputs 302(4), FIG. 3 depicts a user interaction that includes the purchase of an item indicated in the search results responsive to the third query. Based on the initial inputs 302(3) and subsequent inputs 302(4), a predicted intent 102 of "Complementary" may be determined. For example, after inputting three search queries then purchasing an item associated with the third search query, a high probability may exist that a user will intend to search for items that are complementary to the purchased item.

Based on the initial inputs 302(3) and subsequent inputs 302(4), the second example is shown generating an output 304(2) that includes the predicted query 116 "Brand A Model B phone case", which corresponds to the predicted intent 102 of "Complementary" by replacing one or more keywords with keywords that correspond to items that are related to the previous keywords.

FIG. 4 is a block diagram 400 depicting an implementation of a computing device 402 within the present disclosure. The computing device 402 may store and control operations of the components of the system depicted in FIG. 1. For example, the computing device 402 may include one or more servers associated with an online store or other entity that receives search queries, determines search results responsive to search queries, and uses sequences of search queries and predicted intents 102 for subsequent search queries to determine predicted queries 116. While FIG. 4 depicts a single block diagram 400, the depicted computing device 402 may include any number and any type of computing device(s) including, without limitation, one or more servers, personal computing devices, portable computing devices, network-accessible storage devices, and so forth. For example, a first computing device 402 or group of computing devices 402 may be used to receive search queries and determine search results, while a second computing device 402 or group of computing devices 402 may be used to determine predicted queries 116 based on sequences of search queries and predicted intents 102.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clock(s) 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 410, such as input/output (I/O) interfaces 412, network interfaces 414, and so forth. The communication interfaces 410 may enable the computing device 402, or components of the computing device 402, to communicate with other computing devices 402 or components of the other computing devices 402. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input devices or output devices associated with the computing device 402. For example, I/O devices 416 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 416 may be physically incorporated with the computing device 402. In other implementations, I/O devices 416 may be externally placed.

The network interfaces 414 may be configured to provide communications between the computing device 402 and other devices, such as the I/O devices 416, routers, access points, and so forth. The network interfaces 414 may include devices configured to couple to one or more networks including local area networks (LANs), wireless LANs (WLANs), wide area networks (WANs), wireless WANs, and so forth. For example, the network interfaces 414 may include devices compatible with Ethernet, Wi-Fi, Bluetooth, ZigBee, Z-Wave, 5G, LTE, and so forth.

The computing device 402 may include one or more buses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 422 and one or more of the following modules may also be associated with the memory 418. The modules may be executed as foreground applications, background tasks, daemons, and so forth. The data store(s) 422 may use a flat file, database, linked list, tree, executable code, script, or other data structure to store information. In some implementations, the data store(s) 422 or a portion of the data store(s) 422 may be distributed across one or more other devices including other computing devices 402, network attached storage devices, and so forth.

A communication module 424 may be configured to establish communications with one or more other computing devices 402. Communications may be authenticated, encrypted, and so forth.

The memory 418 may additionally store the intent determination module 106. The intent determination module 106 may determine intents associated with received search queries. For example, the intent determination module 106 may include one or more machine learning models that are trained to receive a pair of search queries, or other types of inputs, and determine an intent associated with the latter input of the pair. Based on the manner in which a subsequent query or other type of input differs from a previous query or other type of input, an intent associated with the reformulation or other changes in the latter input may be determined. The intent determination module 106 may be used in this manner to determine a sequence of intents associated with a sequence of queries or other inputs.

The memory 418 may also store the intent prediction module 110. The intent prediction module 110 may determine a predicted intent 102 for a subsequent query or other type of input based at least in part on a sequence of intents determined using the intent determination module 106. In some implementations, the intent prediction module 110 may include one or more machine learning models, or a masked self-attention layer of the machine learning model associated with the intent determination module 106, that is trained to use features of a sequence of previous intents as an input to predict a subsequent intent. In some implementations, the intent prediction module 110 may use other data, in addition to the sequence of intents determined by the intent determination module 106, to determine a predicted intent 102 for a subsequent query or other type of input. For example, a total count of a sequence of queries, or a count of a subset of the sequence of queries may be used to determine the predicted intent 102. In some implementations, the intent prediction module 110 may access user interaction data 112, which may be used in part to determine a predicted intent 102 for a subsequent query or other type of input. A user interaction may include initiation of a transaction for an item, addition of an item to an electronic list, navigation to an interface associated with a search result or other output, and so forth.

The memory 418 may store the query prediction module 114. The query prediction module 114 may determine one or more predicted queries 116 or other types of input based on a predicted intent 102 determined using the intent prediction module 110 and a sequence of queries or other inputs.

For example, the encoding module 118 may determine feature embeddings 120 based on the sequence of queries or other inputs. The feature embeddings 120 may represent text of queries, semantic information, and so forth. In some implementations, the encoding module 118 may include one or more machine learning models, such as a BERT model, or other types of language models or encoders. Use of an existing or pre-trained language model may enable meaningful query embeddings to be generated based on the text of queries or other inputs without requiring an initial cold-start or training period to determine feature embeddings 120 that are usable by the query prediction module 114.

The query prediction module 114 may use at least a portion of the feature embeddings 120 determined using the encoding module 118, and the predicted intent 102, as inputs to determine one or more predicted queries 116. In some implementations, the query prediction module 114 may include one or more machine learning models trained to determine predicted queries 116 based on predicted intents 102 and feature embeddings 120. In some implementations, the query prediction module 114 may perform one or more optimization processes to determine the predicted query 116. For example, determination of a predicted query 116 may include optimization processes such as a loss-minimization process, a process to distribute feature embeddings 120 isotropically in a latent space, and so forth.

The memory 418 may also store the output module 122. The output module 122 may determine output data 124 based on the one or more predicted queries 116 determined using the query prediction module 114. Output data 124 may be provided to a computing device associated with a user to cause output indicative of the one or more predicted queries 116, or other types of input. For example, one or more predicted queries 116 may be presented in association with a search interface, or in association with a set of search results received in response to a previous query. Manual selection of a precited input may enable a user to perform tasks using fewer manual steps, and in some implementations, output associated with one or more predicted inputs may be precomputed to enable more efficient presentation of search results in response to selection of a predicted query 116 by the user.

Other modules 426 may also be present in the memory 418. For example, other modules 426 may include training modules to train machine learning models associated with one or more of the intent determination module 106, intent prediction module 110, query prediction module 114, or encoding module 118. Other modules 426 may include user interface modules for receiving search queries or other inputs, and presenting search results or other outputs, modules for processing search queries and other user input, and so forth. Other modules 426 may further include permission or authorization modules for modifying data associated with the computing device 402, such as threshold values, configurations or settings, machine learning algorithms and training data, and so forth. Other modules 426 may also include encryption modules to encrypt and decrypt communications between computing devices 402, authentication modules to authenticate communications sent or received by computing devices 402, and so forth.

Other data 428 within the data store(s) 422 may include configurations, settings, preferences, default or threshold values associated with computing devices 402, rules and algorithms used by computing devices 402, and so forth. Other data 428 may also include encryption keys and schema, access credentials, and so forth. Other data 428 may further include training data associated with machine learning models.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more non-transitory memories storing computer-executable instructions; and
   one or more hardware processors to execute the computer-executable instructions to:
      determine a sequence of search queries associated with a session, wherein the sequence of search queries includes at least: a first search query comprising first text, a second search query comprising second text, and a third search query comprising third text;
      use the first search query and the second search query as inputs to a first machine learning model to determine a first query intent associated with the second search query, wherein the first machine learning model is trained to determine query intents associated with queries using sequences of queries as training data;
      use the second search query and the third search query as inputs to the first machine learning model to determine a second query intent associated with the third search query;
      determine a sequence of intents that includes at least the first query intent and the second query intent;
      use the sequence of intents as inputs to the first machine learning model to determine an output that indicates a predicted intent for a subsequent query, wherein the first machine learning model is further trained to determine a subsequent query intent based on a sequence of previous query intents;
      use the sequence of search queries and the predicted intent as inputs to a second machine learning model to determine a predicted search query, wherein the second machine learning model is trained to determine subsequent queries based on a sequence of previous queries and predicted intents for subsequent queries, and wherein the predicted search query corresponds to the predicted intent; and
      generate output data indicative of the predicted search query.

2. The system of claim 1, further comprising computer-executable instructions to:
   determine a user interaction associated with at least one item presented in a response to the first search query; and use the user interaction as an input to the first machine learning model, wherein the first machine learning model further determines the predicted intent based on the user interaction.

3. The system of claim 1, further comprising computer-executable instructions to:

determine a total count of queries associated with at least a subset of the sequence of search queries;

determine a relationship between a count associated with a subsequent query and the total count; and use the relationship between the count associated with the subsequent query and the total count as an input to the first machine learning model, wherein the first machine learning model further determines the predicted intent based on the relationship.

4. A system comprising:

one or more non-transitory memories storing computer-executable instructions; and one or more hardware processors to execute the computer-executable instructions to:

determine a sequence of search queries that includes at least a first search query, a second search query, and a third search Query;

use the first search query and the second search query as inputs to a first machine learning model to determine a first query intent associated with the second search query;

use the second search query and the third search query as inputs to the first machine learning model to determine a second query intent associated with the third search query;

use the first machine learning model and a sequence of intents that includes at least the first query intent and the second query intent to determine a predicted intent for a subsequent query;

use the sequence of search queries and the predicted intent as inputs to a second machine learning model to determine a predicted search query; and determine output indicative of the predicted search query.

5. The system of claim 4, further comprising computer-executable instructions to:

use data indicative of the sequence of search queries as an input to the first machine learning model, wherein the first machine learning model further determines the predicted intent based on the sequence of search queries.

6. The system of claim 4, further comprising computer-executable instructions to:

determine a count of intents associated with the sequence of intents, wherein the sequence of intents and the count of intents are used by one or more of the first machine learning model or the second machine learning model to determine the predicted intent.

7. The system of claim 4, further comprising computer-executable instructions to:

determine a user interaction associated with a response to the first search query; and use data indicative of the user interaction as an input to the first machine learning model, wherein the first machine learning model further determines the predicted intent based on the user interaction.

8. The system of claim 4, further comprising computer-executable instructions to:

determine session data indicative of input provided to one or more interfaces that are not associated with the sequence of search queries; and use the session data as an input to the first machine learning model, wherein the first machine learning model further determines the predicted intent based on the session data.

9. The system of claim 4, further comprising computer-executable instructions to:

determine session data indicative of input provided to one or more computing devices external to the system; and determine the first search query based on the input.

10. The system of claim 4, further comprising computer-executable instructions to:

determine, based on a first type of intent associated with one or more search queries of the sequence of search queries, one or more of a total count of queries associated with at least a subset of the sequence of search queries or a normalized count of queries associated with the at least a subset of the sequence of search queries; and use the one or more of the total count or the normalized count as an input to the first machine learning model, wherein the first machine learning model further determines the predicted intent based on the one or more of the total count or the normalized count.

11. The system of claim 4, further comprising computer-executable instructions to:

determine a subset of the sequence of intents that is associated with a first type of intent;

determine one or more of a total count of intents or a normalized count of intents associated with the subset; and use the one or more of the total count or the normalized count as an input to the first machine learning model, wherein the first machine learning model further determines the predicted intent based on the one or more of the total count or the normalized count, and wherein the predicted intent is associated with a second type of intent that differs from the first type.

12. The system of claim 4, further comprising computer executable instructions to:

use a third machine learning model to determine one or more first feature embeddings based on first text of the first search query and one or more second feature embeddings based on second text of the second search query;

wherein the one or more first feature embeddings and the one or more second feature embeddings are used as inputs to the second machine learning model to determine the predicted search query.

13. A system comprising:

one or more non-transitory memories storing computer-executable instructions; and one or more hardware processors to execute the computer-executable instructions to:

determine a sequence of inputs that includes at least a first input, a second input; and a third input;

use the first input, the second input, and a first machine learning model to determine a first intent associated with the second input;

use the second input, the third input, and the first machine learning model to determine a second intent associated with the third input;

use the first intent, the second intent, and one or more of the first machine learning model or a second machine learning model to determine a predicted intent for a subsequent input;

use the predicted intent, the sequence of inputs, and one or more of the first machine learning model, the second machine learning model, or a third machine learning model to determine a predicted input; and determine output indicative of the predicted input.

14. The system of claim 13, wherein one or more of the first input, the second input, or the third input comprises a search query that is input using an interface that is associated with search queries for items available for transactions.

15. The system of claim 13, wherein one or more of the first input, the second input, or the third input comprises a user interaction associated with an item available for transactions.

16. The system of claim 15, wherein the user interaction includes one or more of: navigation to an interface that includes information associated with the item, addition of the item to an electronic list, or initiation of a transaction associated with the item.

17. The system of claim 13, further comprising computer-executable instructions to:

determine session data associated with the sequence of inputs, wherein the session data is indicative of input provided to one or more interfaces that are associated with the sequence of inputs; and determine the first input based on the session data.

18. The system of claim 13, wherein the sequence of inputs is used by the one or more of the first machine learning model or the second machine learning model to determine the predicted intent.

19. The system of claim 13, wherein the sequence of inputs further includes a third input, the system further comprising computer-executable instructions to:

determine a count of intents associated with the sequence of intents, wherein the sequence of intents and the count of intents are used by the one or more of the first machine learning model or the second machine learning model to determine the predicted intent.

20. The system of claim 13, wherein the output includes one or more of:

a list of one or more search queries that include the predicted input presented in association with one or more search results that are presented in response to the third input; or a list of one or more search queries that include the predicted input presented in association with an interface for receiving search queries.

\* \* \* \* \*